United States Patent [19]
Denis

[11] 3,930,136
[45] Dec. 30, 1975

[54] ANCHOR STUDS AND SHEAR CONNECTORS USED IN WELDING

[76] Inventor: Albert P. Denis, 2050 Brookview Road, Castleton, N.Y. 12033

[22] Filed: Nov. 5, 1973

[21] Appl. No.: 412,708

[52] U.S. Cl. .................................. 219/99; 219/137
[51] Int. Cl.² .......................................... B23K 9/20
[58] Field of Search ............ 219/98, 99, 137, 125 R

[56] References Cited

UNITED STATES PATENTS

| | | | |
|---|---|---|---|
| 3,026,130 | 3/1962 | Morrell | 219/137 X |
| 3,183,066 | 5/1965 | Lessmann et al. | 219/137 X |
| 3,501,612 | 3/1970 | Denis | 219/99 X |
| 3,505,495 | 4/1970 | Mitchell | 219/99 |
| 3,705,972 | 12/1972 | Trojani | 219/98 X |

*Primary Examiner*—J. V. Truhe
*Assistant Examiner*—N. D. Herkamp
*Attorney, Agent, or Firm*—Sughrue, Rothwell, Mion, Zinn & Macpeak

[57] ABSTRACT

An arc welding process and metal anchor stud used in the process are disclosed. The stud has a generally cylindrical configuration with the base or weld end enlarged in such a manner that, following the electrode or stick welding thereof, the area of metal contact in the weld fillet adjacent the periphery of the enlargement is in excess of the cross-sectional area of the stud shank above the enlargement. The welding process produces a full 360° weld fillet and is readily performed by a hand gun.

4 Claims, 1 Drawing Figure

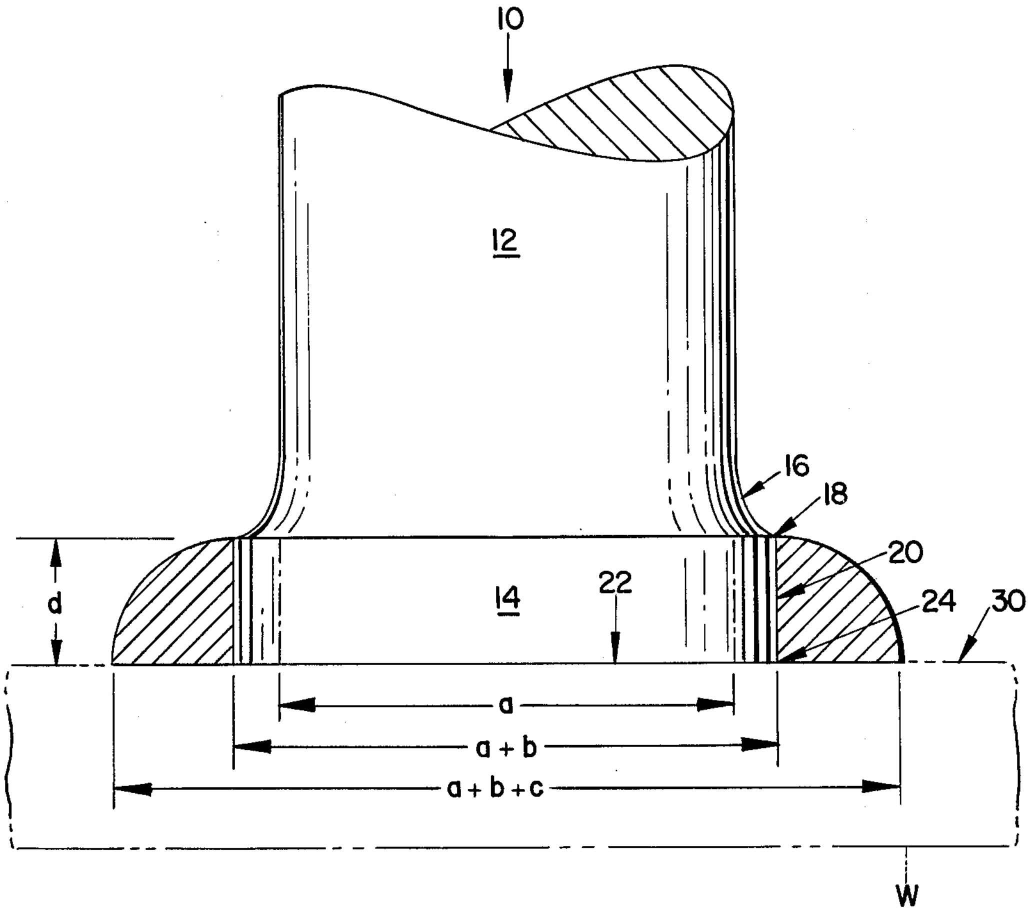
10
12
16
18
20
14
22
24
30
d
a
a + b
a + b + c
W

ANCHOR STUDS AND SHEAR CONNECTORS USED IN WELDING

FIELD OF THE INVENTION

This invention relates to a novel and improved method of and article for arc welding, and more particularly it concerns itself with an arc welding process and a novel metal anchor stud where the metal stud is welded to steel or a shear connector as in steel-concrete construction. The stud is held in contact with a metallic body called a workpiece and a current of relatively nominal value and nominal duration is caused to flow through a consumable electrode so as to produce an arc with the stud or connector and the workpiece. The arc, one pole of which is the electrode and the other pole of which is the metal to be welded, heats the electrode until the surfaces to be joined are properly heated wherein coalescence is produced, with the metal from the electrode melting off and fusing into the joint.

DESCRIPTION OF THE PRIOR ART

Reference hereinafter to either anchor stud or shear connector implies the same procedure and use for the installation of either an anchor stud or a shear connector. Effort will be made to employ the term "stud" throughout with the expressed intent to cover both an anchor stud and a shear connector therewith.

BACKGROUND OF THE INVENTION

Normally, in the case of the prior art, the so-called fused area, that area immediately below the stud shank and adjacent the workpiece, is not readily visible for inspection purposes. Therefore, a hammer blow or the like is necessary to facilitate determination of the success or failure of the attachment at the point of fusion. Such a testing procedure is obviously less than satisfactory. Failure of the attachment is frequent and is typically caused by the pocketing of impurities such as gases from the use of aluminum or lead deoxidizers as starters.

SUMMARY OF THE INVENTION

The invention is particularly directed to a new and useful configuration of a stud for use where the timed arc method is not practical in view of the bulky equipment which necessarily must be employed or for use where access may be had to the welding area only by means of hand or stick welding or for use where it is desired to replace a failed stud which has been installed via one of the known prior art methods.

The invention also has applications in decking where the studs are to be installed through a deck as in the case where the stud is placed above the decking with the stick electrode being used to burn through the deck at the start of the arc as the welding of the stud to the member below the deck continues. That is the arc ahead of the electrode burns off the deck so that the molten pool behind the stud fills in the burned off portion, leaving the stud welded to the workpiece, around the decking that was burned off and replaced by the weld fillet.

The base or weld end of the stud hereof is enlarged in such a manner that, following the electrode or stick welding thereof, the area of metal contact in the weld fillet adjacent the periphery of the enlargement and the workpiece is in excess of the cross sectional area of the stud shank above the enlargement. This is achieved by insuring that the outermost surface area of the face of the fillet adjacent the confronting face of the workpiece is greater than the diameter of the shank of the stud upwardly of the enlarged base or weld end.

Thus the primary object of the invention is to provide a method of arc welding wherein the arc made between the electrode and the peripheral surface of the enlarged stud end and the adjacent peripheral surface of the workpiece produces a fillet wherein no more material is deposited than is necessary and to provide a ready visual means for insuring against such excess deposition.

The system allows a welding procedure which is more economical than prior art procedures both as to welding time and as to material used.

Additionally, the pocketing of impurities so common in the prior art, is herewith eliminated. By this system, a true welding process is envisioned in which time is allowed for all impurities to rise to the surface of the welded metal and to escape as gases or, in the case of unwanted solids, to become part of the flux above the welded area.

The stud configuration hereof also allows the installation of the exotic non-ferrous anchor studs and shear connectors such as those of aluminum or stainless steel, by choosing the correct electrode to match the stud and workpiece to which it is welded, a feature not allowed by the prior art.

By the system hereof, welding may be done by hand with stick electrode welding or by the use of a hand gun of a type such as is shown in my U.S. Pat. No. 3,501,612.

By the configuration hereof, use is made of a full 360° weld fillet, same being readily accepted by those versed in the art as an easy and successful welding technique.

The stud is preferentially coated with sodium silicate or water glass so as to preclude rusting, pitting or scaling during storage and shipment as added protection to insure sound welding.

The configuration eliminates the need for the use of the extra ceramic ferrule or ring as used in the prior art for arc shielding purposes.

By this system, no burn off takes place, there being no shortening of the dimension of the stud. Here the stud dimension is fixed. Herewith there is no burning out of any decking below the welded area. The decking boils up and becomes a part of the weld.

BRIEF DESCRIPTION OF THE DRAWING

For a fuller understanding of the nature and objects of the invention, reference should be had to the following detailed description, taken in connection with the accompanying drawing wherein the FIGURE is a fragmentary view in side elevation of a stud anchored in situ on a workpiece and showing the weld fillet circumscribing same.

DESCRIPTION OF THE PREFERRED EMBODIMENT

A stud 10 employed in the invention is illustrated. Stud 10 may be formed of any of the ferrous or non ferrous metals which are usually welded and may comprise steel or aluminum or alloys thereof.

Stud 10 may have a shank 12 of any desired configuration or cross sectional shape. Preferentially, the stud is generally cylindrical throughout the major portion of its length, having a diameter as denoted by a, and is provided with an enlargement 14 at its weld end which circumscribes shank 12 and takes on the shape of a part of a greatly enlarged fillet commencing to flow outwardly from the shank at an annular locus 16 circumscribing the shank and flowing outwardly to an abrupt termination at an annular locus 18 concentric with locus 16 and shank 12 and merging with a vertically-extending annular wall 20, which wall extends downwardly for a distance denoted by d to the horizontal plane of the end face 22 of the stud. The diameter of the enlargement is denoted as $a + b$.

As will be observed, stud 10 and enlarged weld end section 14 thereof are symmetrical with respect to the longitudinal axes thereof.

Distance *d*, the height of wall 20, is designed to be such as to provide a guide in the formation of an adequate weld fillet, the top of wall 20 at locus 18 indicating to the welder a topmost line of demarcation above which his weld fillet should not and/or need not extend or project and allowing him a visual guide means by which he may mentally and physically translate distance *d* as his gauge in forming his weld so that same extends radially outwardly from wall 20 and along the face of workpiece W a distance denoted by *c*, this distance preferably equalling distance *d*.

Such a stud configuration defines an enlarged diameter of the enlarged weld end portion which is denoted by $a + b$, as aforesaid, and indicating that the stud allows a greater mass at the weld end.

According to the welding method of the invention, stud 10 is preferably positioned with the axis thereof perpendicular to a planar surface 30 of a metallic workpiece W, with its planar end face 22 being in confrontation with surface 30. That is to say, for optimum results, surface 30 should be planar or as close thereto as possible, and the stud should be positioned with its longitudinal axis as close as possible to the perpendicular relative thereto.

The strength of the weld formed by the electrode or stick method is a function of the size of the areas of the adjoining surfaces of the stud and workpiece which are fused together by the welding operation.

The size of the area of fusion should be as small as possible, and this may be facilitated by commencing the welding process with the largest possible area of the end surface of the stud located in close proximity to the surface of the workpiece.

During the welding operation, the flowing metal fills the annular space between the end wall 20 and the workpiece surface so that fusion between the stud and workpiece occurs as a full 360° weld fillet. The area of this weld fillet in contact with surface 30 of workpiece W is expressed as follows:

$$\pi[\tfrac{1}{2}(a+b+c)]^2 - \pi[\tfrac{1}{2}(a+b)]^2$$

The area of the weld fillet in contact with the end wall 20 is expressed as follows wherein the dimension d is assumed to be equal to the dimension ½ *c:*

$$\tfrac{1}{2}\pi(a+b)c$$

Therefore, the total weld area according to the invention is the sum of these two areas which simplifies to the following expression:

$$\pi[ac + bc + \tfrac{1}{4}c^2]$$

Optimum welding results are obtained when and where the total area of the weldment exceeds that afforded by the butt welding of anchor studs known in the prior art. If the area of weldment in the prior art is expressed as $\pi(\tfrac{1}{2}a)^2$, then the condition which must be satisfied according to the invention is as follows:

$$ac + bc + \tfrac{1}{4}c^2 \geqq \tfrac{1}{4}a^2$$

Stated otherwise, the surface area of the weld at the work must be at least equal to and preferably greater than the cross-sectional area of the shank 12 of the stud.

Since certain changes may be made in the above process without departing from the scope of the invention herein involved, it is intended that all matter contained in the above description or shown in the accompanying drawing shall be interpreted as illustrative and not in a limiting sense.

I claim:

1. The method of electric arc stud welding comprising: placing upon a work a stud having at its weld end a base of enlarged diameter and of a base height of a predetermined minimum dimension, introducing a conventional welding electrode within the welding area, initiating an arc through the electrode, and forming a fillet of a radius as established by a vertical leg corresponding to said predetermined minimum dimension and by a horizontal leg of equal dimension.

2. The method of electric arc stud welding comprising: placing upon a work a stud having at its weld end a base of enlarged diameter and of a base height of a predetermined minimum dimension, introducing a conventional welding electrode within the welding area, initiating an arc through the electrode, and forming a fillet of a radius as established by a vertical leg corresponding to said minimum dimension and by a horizontal leg of equal dimension with the rate of deposit being at a speed sufficient to form a square edged fillet.

3. The method of electric arc welding comprising: placing upon a work a stud having a shank of a first diameter and at its weld end a base of enlarged diameter and of a base height of a predetermined minimum dimension, introducing a conventional welding electrode within the welding area, initiating an arc through the electrode, and forming a fillet of effective throat having a radial throat dimension throughout not in excess of the enlarged base height of predetermined minimum dimension, such that the area of metal contact in the weld fillet adjacent the periphery of said enlarged base and the work is equal to or greater than the cross-sectional area of said shank.

4. A stud for electric arc welding comprising:

a generally cylindrical shank having a first diameter, and an enlarged base at the weld end of said stud having a second diameter greater than said first diameter and a height of a predetermined minimum dimension equal at least to the desired radius of a peripheral weld fillet such that the area of metal contact in the weld fillet adjacent the periphery of said enlarged base and a work piece is equal to or greater than the cross-sectional area of said shank.

* * * * *